March 21, 1950 H. A. SOMERS 2,501,588
SCOOP
Filed Oct. 23, 1944
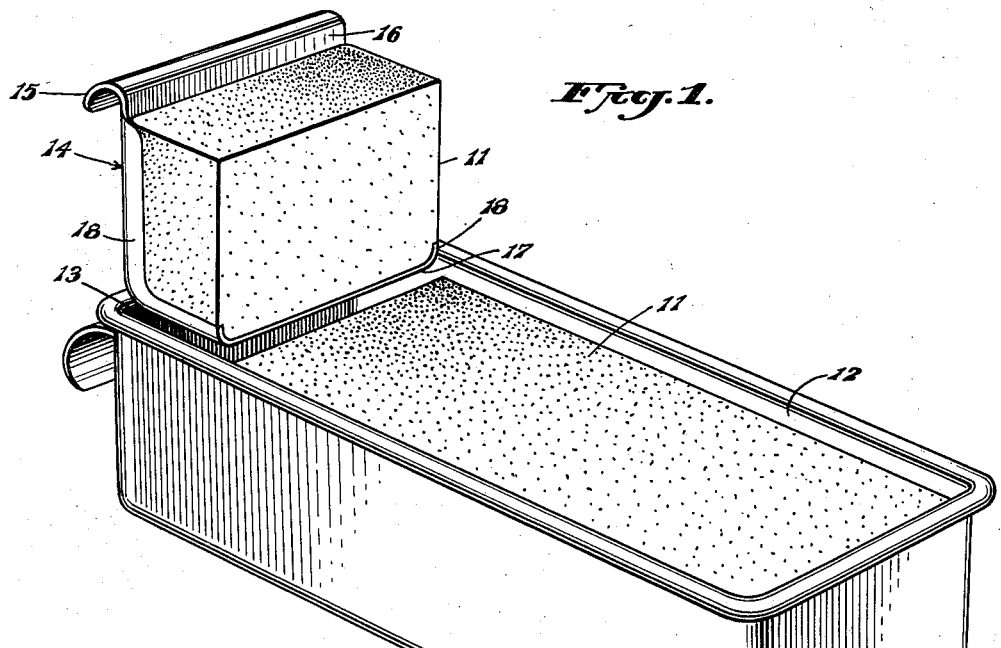
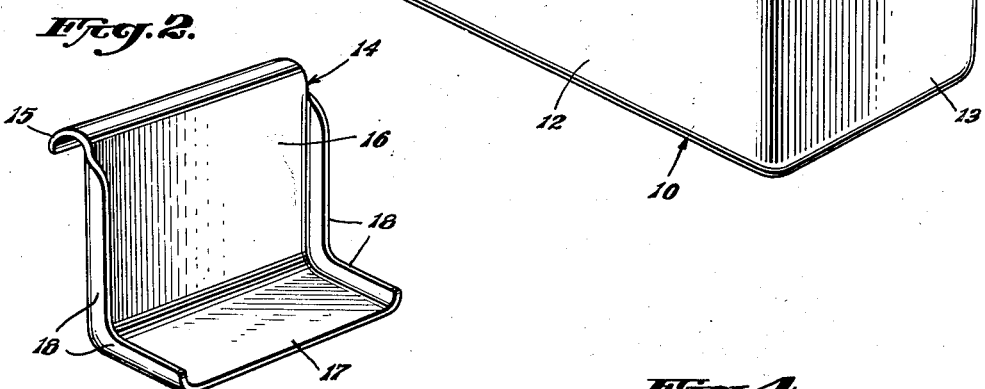
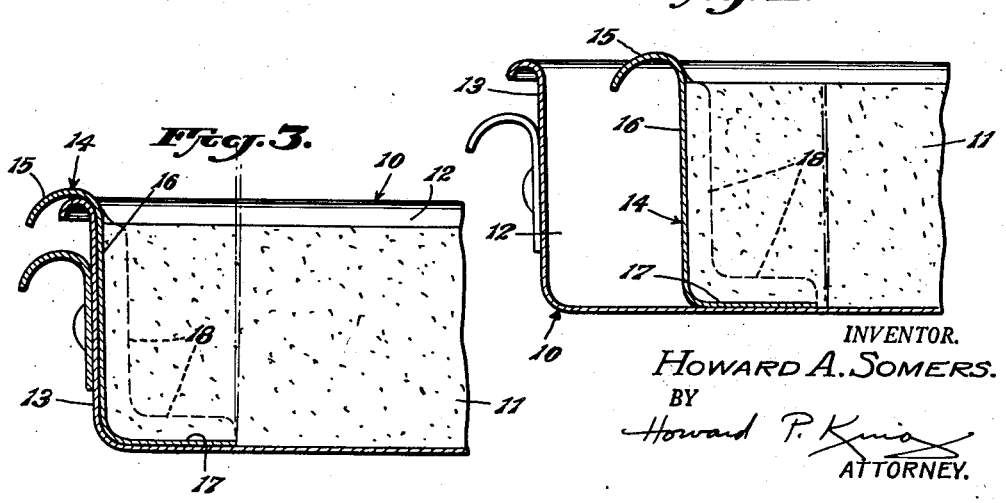
INVENTOR.
HOWARD A. SOMERS.
BY
Howard P. Kn__
ATTORNEY.

Patented Mar. 21, 1950

2,501,588

UNITED STATES PATENT OFFICE 2,501,588

SCOOP

Howard A. Somers, Montclair, N. J.

Application October 23, 1944, Serial No. 559,874

1 Claim. (Cl. 107—19)

This invention relates to scoops, and while having particular adaptation to and utility with freezing units of the modern mechanical refrigerators, is not necessarily confined thereto.

Difficulty has been experienced in the past in extraction of coagulated or formed comestibles from pans, and particularly from deep pans, as unbroken slices or segments. That difficulty is especially pronounced in an endeavor to remove the first slice next the end of a pan without deforming, breaking or crumbling the part being removed. As a specific instance, it has heretofore been practically impossible to slice a frozen comestible, such as ice cream in a refrigerator freezing unit pan, and then remove a slice in unbroken entirety from the pan in which frozen.

The present invention has for its principal and most general object, the purpose of overcoming the difficulties heretofore experienced in properly removing in its entirety a slice from a comestible formed in a pan.

Another object of the invention is to provide a scoop which will engage beneath the slice being removed and engage the slice in perfect parallelism to the bottom of the pan.

A further object of the invention is to provide a scoop which may be included with the comestible in the pan and in position to extract the first slice when desired.

Yet another object of the invention is to provide a scoop which is adequately reenforced to perform its function and yet adapted to be left in the pan while forming the comestible and without materially diminishing the capacity of the pan for the comestible.

Specifically, an object of the invention is to provide a scoop which conforms to a contiguous part of the surface configuration of the pan in which used, and adapted to remove a slice from the pan with the slice retaining the form given to it by the pan.

Other objects of the invention will appear to those skilled in the art to which it appertains as the description proceeds, both by direct recitation thereof and by inference from the context.

Referring to the accompanying drawing in which like numerals of reference indicate similar parts throughout the several views;

Figure 1 is a perspective view of my invention in use extracting a slice of a comestible from a pan;

Figure 2 is a perspective view of the scoop alone;

Figure 3 is a longitudinal sectional view of a pan with the scoop of my invention therein and shown in cross-section in its normal position before any slices have been removed, and showing a comestible in the pan with indication by dot and dash line of a knife-cut made in the comestible for severing the first slice; and Figure 4 is a view similar to Fig. 3, but showing the first slice as having been removed and the scoop reinserted for extraction of the next slice.

In the specific embodiment of the invention illustrated in said drawing, the reference numeral 10 designates a pan in which a comestible 11 is suitably formed, as by freezing or otherwise. The particular pan shown is one such as used in mechanical refrigerators in the freezing units thereof, and the comestible may be ice cream, gelatine or other formed or coagulated edible material or composition. The comestible is put into the pan originally in a fluid or semi-fluid state and consequently assumes the shape of the pan by flowing into juxtaposition to the side walls 12 and end walls 13 of the pan. Then the comestible is hardened or congealed either by natural or artificial process as by setting, cooking or freezing, so as to have the configuration or form of the pan when in condition for serving. The hardened comestible may be sliced, as indicated by dot and dash lines indicating a knife-cut in Figure 3, directly in the pan to the size desired to serve. The heretofore unsolved problem of how to remove the first slice unbroken from the pan then presents itself.

According to the present invention, I provide a scoop 14 having a main or body portion adapted to be situated within the pan at one end thereof and provided with a surface configuration complying with the surface configuration of the interior end portion of the pan. At the upper part of this main or body portion of the scoop is a rolled flange 15 which overlies the upper edge of the end wall of the pan and projects outwardly therefrom a sufficient distance for being conveniently gripped and used as a handle.

Said scoop, described in detail, is shown as having an end wall 16 of substantially equal size, shape, contour, and formed and adapted to fit snugly against one end wall 13 of the pan. At the bottom of the said end wall 16 of the scoop is an integral bottom wall or flange 17 the full width of the interior face of the end wall 13 of the pan and likewise of size, shape, contour and formed and adapted to fit snugly upon an end portion of the bottom of the pan. This bottom wall or flange 17 of the scoop may have desired dimension in a direction longitudinally of the pan, such dimension preferably not exceeding the thickness of the thinnest slice to be cut from the pan contents or comestible 11.

At the sides of the end wall 16 and bottom wall 17 of scoop 14, are side flanges 18 which are integral with said walls of the scoop and have contiguous engagement with the side walls of the pan in use. Preferably the several junctions of walls and flanges of the scoop are with a curvature of the metal agreeable to the rounded meeting of the several walls of the pan. Said flanges 18 reenforce the bottom wall 17 of the scoop to keep it from bending in use with respect to the end wall 16 of the scoop, and also provide for cleavage of the cosmetible from the side walls of the pan, and will keep the extracted slice from sliding sidewise on the scoop.

The scoop, as thus described, is adapted to be applied in the end of the pan when empty and with the end wall 16, bottom wall 17 and flanges 18 of said scoop contiguous to corresponding walls or portions of walls of the pan so as to subtract practically no appreciable part of the pan volume by presence of the scoop therein. The fit is preferably so conformed to the pan shape that substantially no space is left between the scoop and contiguous walls of pan into which the somewhat viscous material constituting the comestible will flow. Use of the scoop accordingly entails no loss of any of the comestible.

When the comestible is formed, coagulated or hardened, the scoop is in place and by slicing the comestible directly in the pan crosswise thereof, a slice next the end of the pan and overlying the bottom flange or wall of the scoop, may be removed intact in its entirety by lifting the scoop, as shown in Fig. 1. After that slice is deposited where desired, the scoop may be returned into the pan and slid under the next slice, as shown accomplished in Fig. 4. That slice is then removed and deposited, and so on for all slices in the pan.

It is to be noted that the side walls or flanges and end wall of the scoop are all perpendicular to the bottom wall or flange thereof, or slope slightly outward in conforming to the shape of the pan, and therefore the scoop is readily withdrawn upwardly from the pan and the comestible slice is readily engaged and as readily disengaged or discharged when desired from the scoop. It may likewise be said that the scoop is preferably of thin material, such as, but not necessarily, metal. The forward edges of the bottom wall and end flanges of the scoop are inherently thin enough or made thin enough to enable the scoop to be forced between the comestible and the pan walls when dipping the second and subsequent slices.

I claim:

In combination with a pan having side, end and bottom walls, a scoop fitting an end portion of said pan, said scoop having an end wall higher than the end wall of the pan and curling outwardly and downward for hooking over the end wall for keeping the end wall of the scoop next the end wall of the pan, said scoop having a bottom wall of much less length than the bottom wall of the pan and adapted to lift a slice only of the contents of the pan.

HOWARD A. SOMERS.

REFERENCES CITED

The following references are of record in the file of this patent:

UNITED STATES PATENTS

| Number | Name | Date |
| --- | --- | --- |
| D. 34,170 | Fortney | Mar. 5, 1901 |
| 552,908 | Jordan et al | Jan. 14, 1896 |
| 1,176,531 | Fite et al. | Mar. 21, 1916 |
| 1,356,432 | Eidt | Oct. 19, 1920 |
| 1,500,007 | Sibbald | July 1, 1924 |
| 1,758,567 | Fernandez | May 13, 1930 |
| 1,797,417 | Hatcher | Mar. 24, 1931 |
| 2,294,569 | Petersen | Sept. 1, 1942 |